Nov. 26, 1940.　　　G. C. THOMAS, JR　　　2,222,693
PRESSED PIPE COUPLER
Filed Aug. 3, 1939
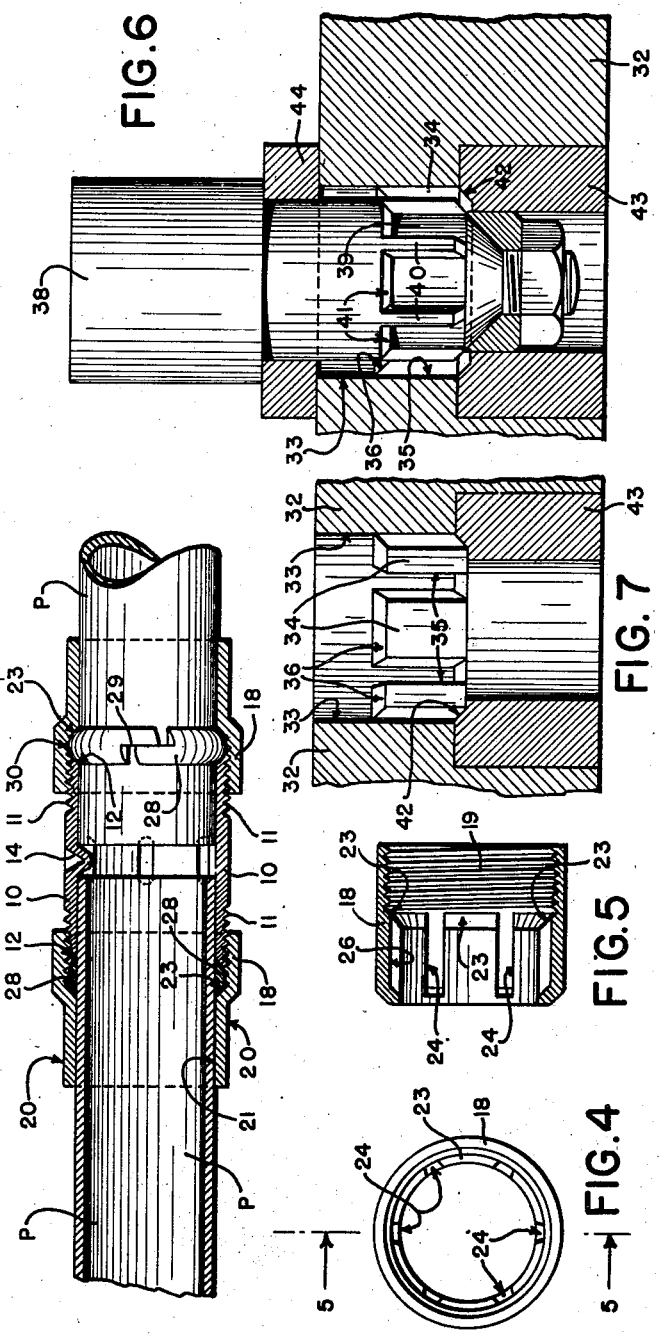
INVENTOR
GEORGE C. THOMAS JR.
BY
　　　　ATTORNEYS Patented Nov. 26, 1940

2,222,693

UNITED STATES PATENT OFFICE 2,222,693

PRESSED PIPE COUPLER

George C. Thomas, Jr., Elizabeth, N. J., assignor to The Thomas & Betts Co., Elizabeth, N. J., a corporation of New Jersey Application August 3, 1939, Serial No. 288,070

3 Claims. (Cl. 285—166)

The invention relates to a pressed pipe coupler having an operating nut and sleeve which are pressed from a tubular blank. The pipe coupler is of the type which includes a contractile ring to grip the unthreaded end of a pipe so that it is secured within the pipe coupler and to some other structure, such as the end of another pipe. The invention relates more particularly to the operating nut which cooperates with a body or sleeve to reduce the diameter of the contractile ring by relative longitudinal movement between the sleeve and operating nut and thereby grip a pipe within the coupler.

An object of the invention is to produce a threadless type of pipe coupler having a sleeve, contractile ring and an operating nut, and in which the new construction of the nut adapts it to be drawn and pressed from a tubular blank, the nut having locking means for gripping the contractile ring and other features to lock the coupler together against any loosening tendency arising from vibration or other causes.

Another object of the invention is to produce an operating nut for a pipe coupler by pressing the same from a piece of tubing in such a fashion that wrench engaging ridges are formed in the outer surface thereof and segmental inclined internal abutments or conical shoulders are thusly spaced and provided against which the contractile ring presses, whereby contraction thereof is obtained to grip the threadless pipe and lock the nut against loosening.

Another object of the invention is to devise a method of producing an operating nut for a pipe coupler, which utilizes a contractile ring to grip the pipe, by pressing the nut from a piece of straight tubing in such a fashion that wrench gripping ridges are formed and at the same time the internal inclined abutments are provided for engaging the contractile ring of the coupling.

Other objects of the invention will be more apparent from the following description taken in connection with the accompanying drawing, illustrating a preferred embodiment of the invention, in which:

Figure 1 is a plan view of a double ended threadless pipe coupler in which the operating nut and sleeve or body are formed by being pressed from tubing. The threadless or smooth ends of two pipes are shown secured in the coupler.

Figure 2 is a longitudinal section through one end of the threadless pipe coupler with the end of a pipe secured therein which is also in section. The other end of the pipe coupler shows, in elevation, the end of a pipe and a contractile ring gripping the pipe. The operating nut and sleeve are shown in section.

Figure 3 is a cross section through the operating nut taken on line 3—3 of Figure 1.

Figure 4 is an end view of the operating nut.

Figure 5 is a longitudinal section through the operating nut showing internal grooves and inclined circumferential shoulders for engaging the contractile ring.

Figure 6 is a view showing a die for pressing an operating nut from a tubular blank. The die includes a body which is shown in section, and a plunger which is shown in elevation and projected into the body in the position it assumes after the pressing operation has been completed.

Figure 7 is a sectional view through the body part of the die of Figure 6 with the plunger part removed.

A pipe coupler can be considerably reduced in cost of manufacture if the parts thereof are pressed from tubular blanks. The pipe coupler utilizes a body member in the form of a sleeve and an operating nut, each of which provides an abutment between which a contractile ring is squeezed upon relative longitudinal movement between the sleeve and the operating nut. When the contractile ring is squeezed, it contracts and grips a smooth end of the pipe or conduit within the coupler. With this type of pipe coupler, the ends of the pipe need not be threaded and hence such a construction is called a threadless pipe coupler.

The pipe coupler includes a body or sleeve 10, at least one end of which carries external threads 11, whereby the sleeve is an externally threaded member. Both ends of the sleeve may be threaded, as illustrated, although this is not essential. The end of the sleeve 10 provides an inclined abutment or conical annular shoulder 12. The sleeve carries longitudinally extending ridges 13 which are spaced around the circumference of the sleeve and provide wrench gripping means. These ridges are formed by pressing outwardly on the inner surface of the sleeve. A pipe stop 14 may be formed by pressing a depression in the outer surface of the sleeve which produces a projection upon the inside thereof which is engaged by the end of a pipe when inserted in the sleeve.

An operating nut 18 is carried upon at least one end of the sleeve 10. This nut carries internal threads 19 which are received upon the threads 11 of the sleeve. The operating nut is initially a straight pipe or tubular member which is pressed into the form illustrated, as will appear more fully hereinafter. One end of the operating nut has a plurality of depressed sections or depressions 20 spaced circumferentially in the outer surface and at one end thereof. The depressions have a depth such that the inner surfaces 21 thereof have a diameter so that the pipe P to be coupled within the pipe coupler passes easily therethrough, and the two pipes P are supported against sagging by these inner surfaces. Those portions of the tubular sleeve blank between the depressions 20, which are not depressed, remain as of their original diameter and thereby form longitudinally extending ridges 22. These ridges provide means which can be gripped by a wrench in tightening the operating nut upon the sleeve or unloosening the same therefrom.

The depressions 20 are projections upon the inside of the operating nut. The internal circumferential edges of these projections, formed by the depressions 20, are inclined so that internal circumferential segmental wedging and spaced shoulders 23 are provided having inclined surfaces. These shoulders form an inclined abutment which is engaged by and locked with a contractile ring upon relative longitudinal movement of the operating nut 18 upon the sleeve 10, the relative longitudinal movement, of course, being obtained by the threads 11 on the sleeve and the threads 19 on the operating nut.

In pressing the depressions 20 inwardly for spacing and forming the external longitudinally extending ridges 22 it follows that the longitudinally extending grooves 24 are coincidentally formed upon the inside of the operating nut as a part of the wedging segments 23. It is desirable that these internal grooves 24 be closed at the end of the operating nut, although this may not be essential. Sealing or closing of the open ends of the grooves is accomplished by mashing the end of the operating nut in the pressing operation, which mashing closes up the open ends of the grooves so that they do not extend to the end of the operating nut.

A contractile ring 28 may be of any suitable construction. Such contractile rings have a cross slit or split 29 which renders them contractile. Such slit is preferably of a zigzag form which renders the same water or moisture proof, that is prevents moisture from passing through the slit into the coupling and conduits. The outer surface 30 of the ring may be rounded to form tapers at each edge thereof, one of which engages the several inclined wedging shoulders 23 on the operating nut 18, and the other edge engages the annular conical end 12 of the coupler body 10 so that when the contractile ring is squeezed therebetween upon relative longitudinal movement between these two parts, the ring contracts to firmly grip the pipe P.

It is important to note that the several wedging shoulders 23 are annularly spaced and this new construction permits the metal of the gripping ring 28 to deform and flow into the gaps left by the plurality of spaced shoulders. In other words, the contractile gripping ring 28 is squeezed between the annular ring seats 28 and 23, resulting in deforming the ring into the gaps between the adjacent ends of the segmental wedges 23 so that the ring bites into and between the ends of the wedges. This locks the assembly in tight relation against any unscrewing and loosening tendency.

The pipe coupler particularly illustrated is a double ended type and both ends of the pipe coupler are shown to be identical. It is clear that any other type of pipe coupler may be used at one end and the pipe coupler construction described herein may be used upon the other. It is clear, too, that the pipe coupler need not be a double ended structure and the sleeve may be part of some other structure, such as a sleeve carried by or integral with an outlet box or other electrical fitting.

The operating nut is pressed into its finished form or shape from a tubular or sleeve blank in a die illustrated in Figure 6. The die includes a body 32 having a cylindrical bore 33 therein. This bore receives the operating nut blank. The lower portion of the bore has a plurality of lands 34 which are spaced circumferentially around the periphery at the bottom of the bore. Each land 34 corresponds with the size of each depression 20 to be made in the exterior surface of the operating nut, and the end 36 of each land is inclined. Between each land 34 is a groove 35 which permits a portion of the end of the operating nut to retain its original dimension and thereby forms the external longitudinally extending ridges 22 at one end of the operating nut.

A plunger 38 forces the tubular blank into the bore 33. This plunger has on its end a plurality of depressions 39 which are spaced circumferentially, whereby a plurality of circumferentially spaced and longitudinally extending ridges 40 separate each depression 39. The depressions 39 correspond in number and circumferential spacing with the lands 34. The longitudinally extending ridges 40 are smaller in dimension than the grooves 35 and correspond in position therewith so that sharply defined ridges 22 are formed upon the operating nut. The end of each depression 39 has an inclined surface 41 which cooperates with the inclined end 36 of its cooperating land 34 to shape or form each internal inclined shoulder 23 within the operating nut.

In pressing the operating nut 18, a tubular blank of proper length is inserted in the bore 33. The plunger 38 then moves downwardly into the tubular blank and a stripper 44 engages the end of the tubular blank and forces the same farther downwardly into the bore 33 in the body 32. As the tubular blank is pushed downwardly, the lands 34 in the bore form the spaced depressions 20 upon the operating nut. At the same time, the ridges 40 upon the plunger 38 pass downwardly in alignment with the grooves 35 in the body 32 or between the lands 34 and retain the original diameter of the tubular blank within the grooves, whereby the ridges 22 upon the operating nut are sharply defined.

The longitudinally extending ridges 40 upon the plunger 38 form the internal grooves 24 within the operating nut, and the ends of these internal grooves are closed by the final pressure exerted upon the end of the tubular blank by the plunger 38, so that the end of the operating nut is mashed against a shoulder or abutment 42 in a filler 43 carried by the body 32. The shoulder 42 mashes or presses the end of the operating nut so that the longitudinally extending grooves 24, formed by the ridges 40 of the plunger 38, are closed or substantially closed at their ends. Upon completion of the downward stroke, the plunger 38 is pulled upwardly and the pressed operating nut moves upwardly therewith. The stripper 44 forces the pressed operating nut from the end of the plunger. The operating nut is then tapped to provide the internal threads 19.

This invention is presented to fill a need for improvements in a pressed pipe coupler. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A pipe coupler adapted to join with a threadless pipe, comprising a tubular body member having a threaded end and into which the pipe is adapted to be inserted, a nut of tubular form adapted to fit onto the pipe and being internally threaded at one end and screwed onto the body member, conical annular wedging shoulders formed on the body member at the outer end of its threads and also in the nut at the inner end of its threads, a contractile gripping ring adapted to fit onto the pipe and into the nut between the two wedging shoulders and squeezed around the pipe by the screw pressure of the threads, and one of the annular wedging surfaces aforesaid being segmental in form thus providing several circumferentially spaced wedging surfaces with gaps therebetween into and against which the contractile ring deforms and bites by reason of the screw pressure, whereby the coupler is locked with the pipe due to the biting engagement between the ring and segmental wedging surfaces.

2. A pipe coupler adapted to join with a threadless pipe, comprising a tubular body member having a threaded end into which the pipe is adapted to be inserted, a nut of tubular form adapted to fit onto the pipe and being internally threaded at one end and screwed onto the body member, a conical annular wedging shoulder formed on the body member at the outer end of its threads, several spaced wedging shoulders segmentally formed in the nut at the inner end of its threads, thus providing gaps between said segmental ends, and a contractile gripping ring adapted to fit onto the pipe as well as into the nut and being disposed between the annular wedging shoulder and the segmental shoulders so as to be squeezed therebetween and contracted around the pipe by screw pressure, whereby the contractile ring is caused to deform and bite into the ends of the segmental shoulders and flow into gaps therebetween by reason of the screw pressure aforesaid, thereby locking the nut on the body member.

3. A nut comprising a tubular member substantially of uniform diameter from end to end, screw threads formed on the nut for engagement with another threaded member when adapting said nut to use, wedging shoulders circuumferentially spaced internally of the nut in segmental form, thus affording gaps between the adjacent ends of the segments, whereby a ring-like element adapted to be received into the nut is forced against the spaced wedging shoulders and bites into the segmental ends defining the gaps therebetween for locking the nut on another member aforesaid, and depressions spaced externally of said nut coincident with and forming a part of the internal wedging segments.

GEORGE C. THOMAS, Jr.